Oct. 11, 1927.　　　　　J. SLEPIAN　　　　　1,645,306
MICROPHONE CIRCUIT
Filed April 28, 1924
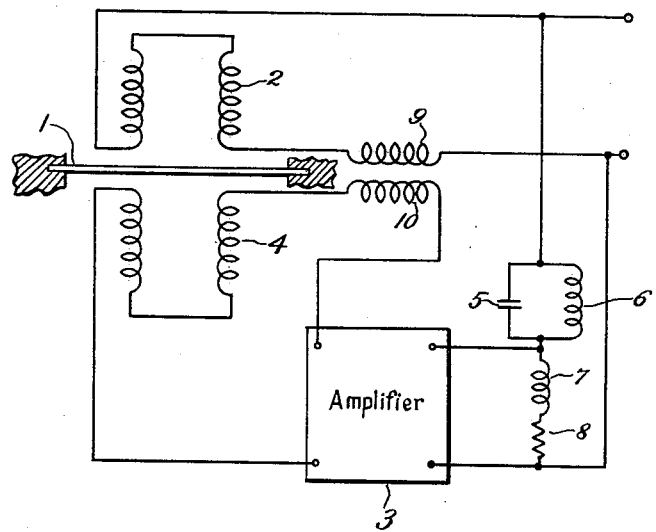
WITNESSES
　　　　　　　　　　　　　　　　　　　　　　　INVENTOR
　　　　　　　　　　　　　　　　　　　　　　　Joseph Slepian
　　　　　　　　　　　　　　　　　　　　　　　BY
　　　　　　　　　　　　　　　　　　　　　　　ATTORNEY Patented Oct. 11, 1927.

1,645,306

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

MICROPHONE CIRCUIT.

Application filed August 28, 1924. Serial No. 734,609.

This invention relates to microphones. It is an improvement upon the invention described in the joint application of myself and C. R. Hanna, Serial No. 734,608, filing date Aug. 28, 1924, for improvement in a sound-translating device (Case No. 11244).

The principal object of this invention is to provide a compensating device whereby the coupling between two coils which, in certain forms of this invention, cannot be completely shielded from each other, is neutralized.

The structure described in the above-identified co-pending application includes a diaphragm, a coil in which the motion of the diaphragm causes an electromotive force, a coil which acts upon the diaphragm, and an amplifier, by means of which the electromotive force in the first coil controls the current in the second coil. Said structure also includes certain devices for determining the phase of the current in the coil which acts upon the diaphragm. One object of this invention is to provide a means for insuring that the phase thus determined is not affected by the coupling effect between said two coils.

Ordinarily the two coils just mentioned will be situated upon opposite sides of the diaphragm. The magnetic material of the diaphragm affords a path for the flux by means of which most of the flux generated in the diaphragm-actuating coil is prevented from reaching the diaphragm-responsive coil. The present invention provides an expedient by means of which the effect of the flux which is mutual to the two coils may be counteracted.

The force exerted by the coil 4 is intended to compensate for the reactions which are due to the mass and stiffness of the diaphragm. In order that it shall correctly do this, the phase of this force must be right. It is an object of this invention to provide means for ensuring that the phase of the compensating force shall be as intended.

Other objects of the invention and the structural details by which it may be utilized will be evident from the following description and accompanying drawing in which:

The single figure is a diagrammatic illustration showing the relation of the several parts and circuits.

The diaphragm 1 is moved by the impact of sound waves. Its motion generates a changing electromotive force in the coil 2. This electromotive force is impressed upon in the input circuit of the amplifier 3. The output circuit of the amplifier supplies current to the coil 4, which can exert a force upon the diaphragm.

Although the illustration chosen would seem to indicate that the force exerted by the coil 4 is due to direct magnetic action between said coil and the diaphragm, 1, and, although the illustration chosen would seem to indicate that the movement of the diaphragm 1 affects the coil 2 by changing the reluctance of the magnetic circuit therethrough, it is to be understood that any arrangement by which coil 4 can exert force upon the diaphragm and electromotive force may be generated in the coil 2 by movement of the diaphragm, is within the invention.

The input circuit of the amplifier 3 includes a condensive reactor 5 and an inductive reactor 6, in parallel. It also includes a small inductor 7 and a large resistor 8 in series with the two reactors just mentioned. The purpose of these elements is explained at length in the above-identified co-pending application. Briefly, it is to give the proper phase to the electromotive force impressed upon the input of the amplifier 3 and thus to determine the phase in the coil 4.

The coil 4 should be non-inductively related to the coil 2. The diaphragm 1, since it affords a path of small reluctance from one pole of the coil 4 to the other and also from one pole of the coil 2 to the other, will largely prevent any flux generated in one coil from producing an effect in the other. In order that this prevention may be complete, the diaphragm must be thicker, and, therefore, heavier, than is desirable. There will, consequently, be some magnetic coupling between coils 2 and 4.

A small transformer, including a winding 9 in the circuit of the coil 2 and a winding 10 in the circuit of the coil 4, is provided. The direction of the windings and the choice of connections in the respective circuits is such that the effect of the coupling between coils 9 and 10 is opposite to the effect of the coupling between coils 2 and 4. Also, the coupling between coils 9 and 10 is of the proper magnitude to neutralize the coupling between coils 2 and 4.

It, therefore, results that the phase of the current in the coil 4 is determined wholly by the elements 5, 6 and 7 and may, therefore, be fixed by the designer with certainty.

Although I have described but one form of my invention, other modifications beside that herein illustrated and described will readily occur to those skilled in the art. It is not intended that the fact that but one modification is specifically illustrated and described shall be considered a limitation. No limitation except what is required by the prior art and is indicated in the claims is intended.

I claim as my invention:

1. In a sound-translating system, a sound-responsive, vibrating diaphragm, a coil arranged to have an electromotive force generated therein by the movement of said diaphragm, a second coil arranged to produce force acting on said diaphragm corresponding to the current in said second coil, an amplifier, a circuit, including said first coil, a phase determining device and the input of said amplifier, a second circuit, including said second coil and the output of said amplifier, and a coupling between said circuits of a magnitude and direction to counteract the coupling between said two coils, whereby the coupling between said coils is without effect upon the phase of the current in said second coil.

2. In a sound-translating system, an amplifier, a diaphragm, means responsive to the movement of said diaphragm for feeding the input of said amplifier, means for modifying the movement of said diaphragm responsive to the output of said amplifier, and a coupling distinct from each of said means between the input and output of said amplifier.

3. A sound-translating system including a member movable in response to sound, an electric network comprising output conductors and means cooperating with said movable member to impress upon said output conductors an electromotive force corresponding to the movement of said member, said network also comprising means for exerting force upon said movable member whereby said force will be of proper phase to overcome the reaction caused by the mass and stiffness of said movable member, and said network also including means for preventing the phase of said force from being affected by electromagnetic coupling between said first named means and said second named means.

4. In a sound-translating system, a coil, a movable member for inducing electromotive forces in said coil, a reaction compensating coil associated with said movable member, and means for counteracting any coupling which may exist between said coils.

In testimony whereof, I have hereunto subscribed my name this 25th day of August, 1924.

JOSEPH SLEPIAN.